United States Patent
Roberts

(10) Patent No.: US 9,132,556 B2
(45) Date of Patent: Sep. 15, 2015

(54) ROBOT ARM

(76) Inventor: Isabelle Roberts, Orono (CA)

( * ) Notice: Subject to any disclaimer, the term of this patent is extended or adjusted under 35 U.S.C. 154(b) by 370 days.

(21) Appl. No.: 13/543,078

(22) Filed: Jul. 6, 2012

(65) Prior Publication Data

US 2013/0174683 A1 Jul. 11, 2013

Related U.S. Application Data

(60) Provisional application No. 61/505,198, filed on Jul. 7, 2011.

(51) Int. Cl.
*B25J 18/00* (2006.01)
*B25J 9/06* (2006.01)
*B25J 9/08* (2006.01)
*B25J 18/02* (2006.01)

(52) U.S. Cl.
CPC .. *B25J 18/00* (2013.01); *B25J 9/06* (2013.01); *B25J 9/08* (2013.01); *B25J 18/025* (2013.01); *Y10T 74/20305* (2015.01); *Y10T 74/20317* (2015.01)

(58) Field of Classification Search
CPC ................ B25J 18/00; B25J 9/06; B25J 9/08; B25J 18/025
USPC ............... 74/490.01, 490.02, 490.03, 490.04, 74/490.05, 490.06; 901/23, 27
See application file for complete search history.

(56) References Cited

U.S. PATENT DOCUMENTS

| | | | | |
|---|---|---|---|---|
| 5,265,490 A | * | 11/1993 | Azuma et al. | 74/490.04 |
| 6,394,998 B1 | * | 5/2002 | Wallace et al. | 606/1 |
| 6,701,220 B1 | * | 3/2004 | Lundstrom et al. | 700/245 |
| 8,601,899 B2 | * | 12/2013 | Raju | 74/490.05 |
| 2010/0242660 A1 | * | 9/2010 | Offer et al. | 74/490.05 |
| 2012/0174317 A1 | * | 7/2012 | Saracen et al. | 5/601 |
| 2013/0053866 A1 | * | 2/2013 | Leung et al. | 606/130 |
| 2014/0013893 A1 | * | 1/2014 | Asano et al. | 74/490.02 |

* cited by examiner

*Primary Examiner* — David M Fenstermacher
(74) *Attorney, Agent, or Firm* — Gowling, Lafleur & Henderdon LLP

(57) ABSTRACT

A robot arm link comprises a base, a first section rotationally coupled to the base, a second section pivotally coupled to the first section and a third section attached to the second section and having a fixed portion and a movable portion, the movable portion coupled to the fixed portion for movement between first and second portions, the movable portion having an attachment plate for attachment to another robot arm link. The links can be used to construct an arm with multiples of three degrees of movement. For example, three links are joined together and mounted on a rotation base and terminated with a pivot or wrist joint to provide a total of 11 degrees of movement.

17 Claims, 2 Drawing Sheets

ROBOT ARM

FIELD OF THE INVENTION

The present invention relates to a robot arm and is particularly concerned with robot arm link modules.

BACKGROUND OF THE INVENTION

Industrial robot arms having six axes are considered sufficient for most applications. However there are specialized applications that require more degrees of freedom. However, the way in which additional degrees of freedom are added can adversely affect the ability to precisely control the arm and do not necessarily provide more flexibility and dexterity.

The robot arm link disclosed herein obviates or mitigates at least some of the aforementioned disadvantages.

SUMMARY OF THE INVENTION

An object of the present invention is to provide an improved robot arm link.

In accordance with an aspect of the present invention there is provided a robot arm link comprising a base, a first section rotably coupled to the base, a second section pivotably coupled to the first section and a third section attached to the second section and having a fixed portion and a movable portion, the movable portion coupled to the fixed portion for movement between first and second portions, the movable portion having an attachment plate for attachment to another robot arm link.

In an exemplary embodiment, three links are joined together and mounted on a rotation base and terminated with a pivot or wrist joint to provide a total of 11 degrees of movement.

The present robot arm link incorporates of both linear and rotary movements within one link, with the ability to connect multiple links together, thus offering a range of reach and joint configurations. Each link includes two rotary joints, one at each end, plus one linear joint, all encased in a composite based tube for lightweight rigidity. The tube or link length can vary, depending on the application requirements. Under this configuration, each link includes three axis of motion.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1:
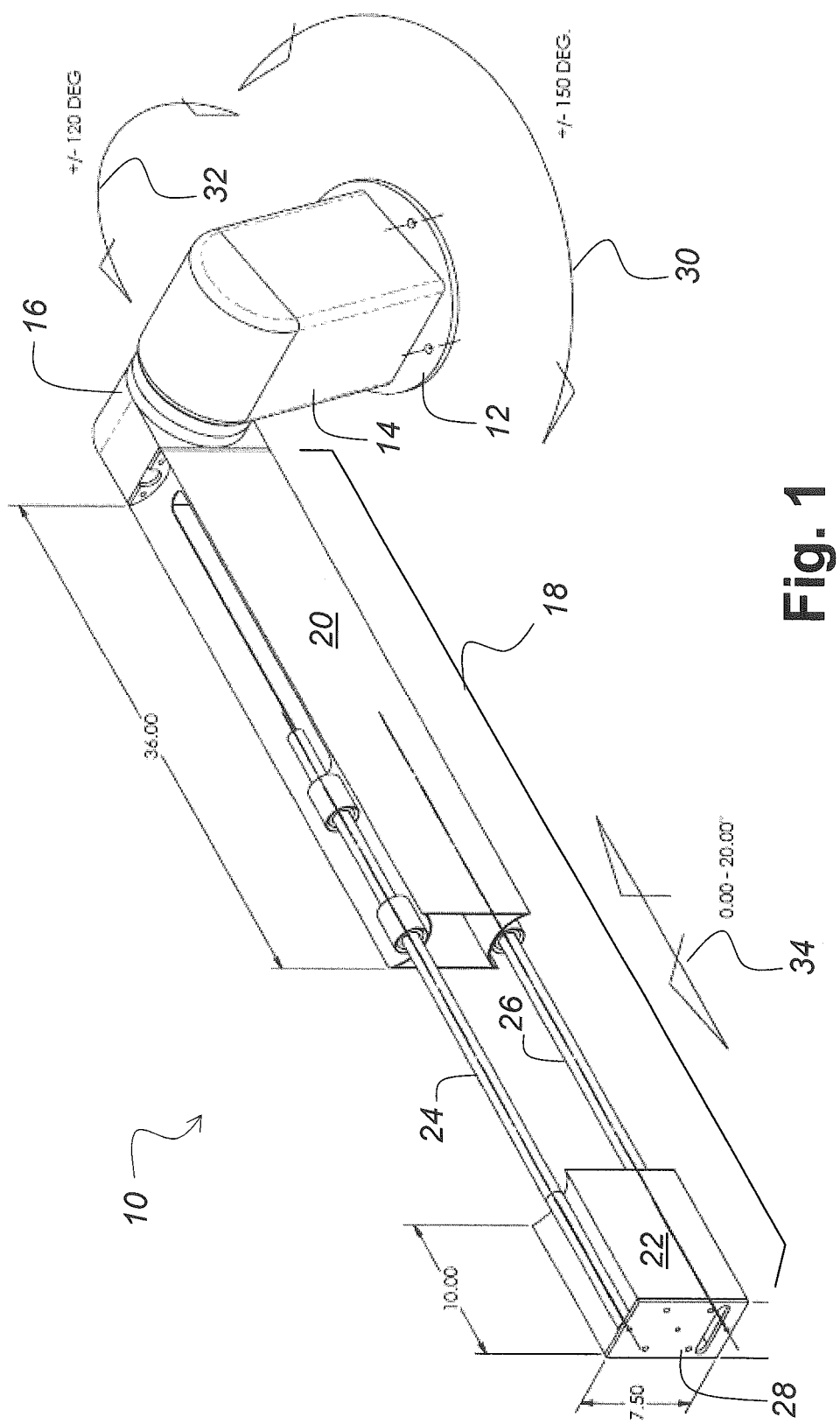
FIG. 1 illustrates a robot arm link in accordance with an embodiment of the present invention.

Referring to FIG. 1 there is illustrated a robot arm link in accordance with an embodiment of the present invention. The robot arm link 10 includes a base 12, a first section 14 rotationally mounted on the base, a second section 16 pivotally attached to the first section 14 and a third section 18 attached to the second section 16. The third section 18 includes a fixed portion 20 and a movable portion 22, coupled to the fixed portion by rods 24 and 26 for linear motion between first and second positions along a longitudinal axis of the third section. The movable portion 22 includes an attachment plate 28.

In operation, the arm link is rotatable 30 about the base 12, pivotable 32 about the first section 14 and extendable 34 along the longitudinal axis. For simplicity of the illustration, motors required to provides the describe motions are not shown in the figures as these are well know to a person of ordinary skill in the art. The robot arm link 10 therefore provides three degrees of motion.

Figure 2:
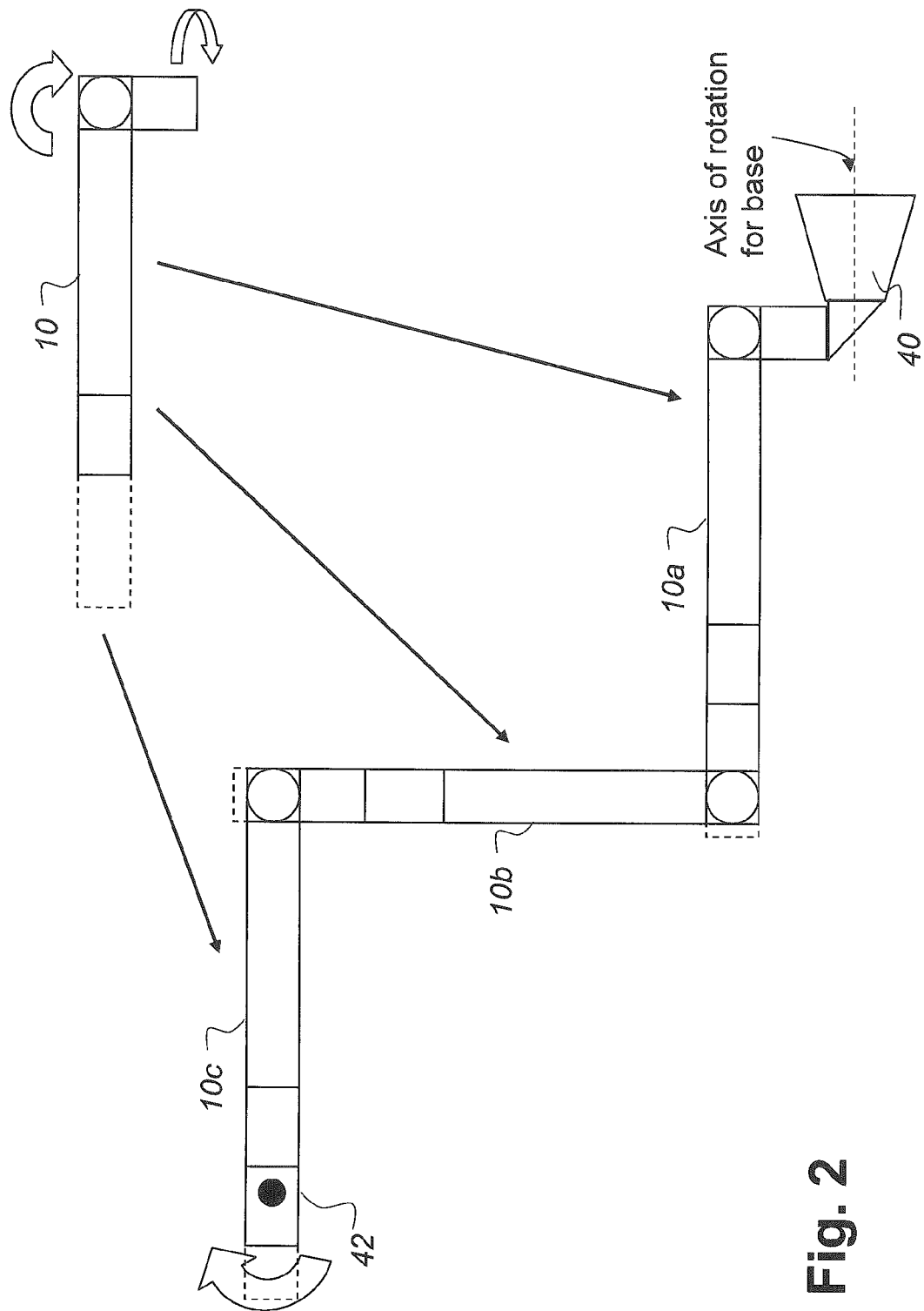
FIG. 2 illustrates a robot arm comprising several robot arm links of FIG. 1 in accordance with an embodiment of the present invention.

Referring to FIG. 2 there is illustrated a robot arm comprising several robot arm links of FIG. 1 in accordance with an embodiment of the present invention. FIG. 2 illustrates how a robot arm requiring a larger number of degrees of motion can be constructed using the robot aim link of FIG. 1. In the example of FIG. 2, three robot arm links 10 are used. A first robot arm link 10*a* is attached to a mount 40 for rotation about an axis of the base. A second robot arm link 10*b* is connected to the first robot arm link 10 via the attachment plate 28*a* and base 12*b*. Similarly, a third robot arm link 10*c* is connected to the second robot arm 10*b* link via the attachment plate 28*b* and base 12*c*. Finally a pivot jointed end section 42 is attached to the attachment plate 28*c*.

In the configuration of FIG. 2, each robot arm link 10 provides three degrees of motion. Consequently, the robot arm of FIG. 2 has a total of 11 degrees of motion. Because the positioning of the attachment plate 28 each robot arm link is determinable, the overall positioning of the robot arm can be determined by summation of the position of each of the component links.

Numerous modifications, variations and adaptations may be made to the particular embodiments described above without departing from the scope patent disclosure, which is defined in the claims.

What is claimed is:

1. A robot arm link comprising:
   a base;
   a first section rotationally coupled to the base;
   a second section pivotally coupled to the first section; and
   a third section attached to the second section and having a fixed portion and a movable portion, the movable portion coupled to the fixed portion for linear movement between first and second positions, the movable portion having an attachment plate for attachment to a base of another robot arm link.

2. The robot arm of claim 1, wherein the robot arm link includes a drive for moving the movable portion between the first and second positions.

3. The robot arm of claim 2, wherein the drive is a servo motor.

4. The robot arm of claim 2, wherein the drive is a linear motor.

5. The robot arm of claim 1, wherein the first section includes a servo motor for effecting rotation about the base.

6. The robot arm of claim 5 wherein the rotation about the base is limited to a predetermined range.

7. The robot arm of claim 1, wherein the second section includes a servo motor for effecting pivoting relative to the first section.

8. The robot arm of claim 7 wherein the pivoting relative to the first section is limited to a predetermined range.

9. A robot arm comprising:
   a first robot arm link comprising:
   a base;
   a first section rotationally coupled to the base;
   a second section pivotally coupled to the first section; and
   a third section attached to the second section and having a fixed portion and a movable portion, the movable portion coupled to the fixed portion for linear movement between first and second positions, the movable portion having an attachment plate for attachment to a base of another robot arm link; and a second robot arm link comprising:

a second base attached to the attachment plate of the first robot arm link;

a fourth section rotationally coupled to the second base;

a fifth section pivotally coupled to the fourth section; and a sixth section attached to the fifth section and having a second fixed portion and a second movable portion, the second movable portion coupled to the second fixed portion for linear movement between third and fourth positions.

10. The robot arm of claim 9, wherein the first robot arm link includes a first drive for moving the movable portion between the first and second positions and the second robot arm link includes a second drive for moving the second movable portion between the third and fourth positions.

11. The robot arm of claim 10, wherein at least one of the first drive and second drive is a servo motor.

12. The robot arm of claim 10, wherein at least one of the first drive and second drive is a linear motor.

13. The robot arm of claim 9, wherein the first section of the first robot arm link includes a first servo motor for effecting rotation about the base and the fourth section of the second robot arm link includes a second servo motor for effecting rotation about the second base.

14. The robot arm of claim 13 wherein the rotation about the base or the second base is limited to a predetermined range or at least one of the links.

15. The robot arm of claim 9, wherein the second section of the first robot arm link includes a servo motor for effecting pivoting relative to the first section and the fifth section of the second robot arm link includes a second servo motor for effecting pivoting relative to the fourth section.

16. The robot arm of claim 15 wherein the pivoting relative to the first or the fourth section is limited to a predetermined range.

17. The robot arm of claim 9 further comprising a third robot arm link attached to a second attachment plate of the second movable portion of the second robot arm link.

* * * * *